United States Patent [19]

Mignot

[11] Patent Number: 5,401,422
[45] Date of Patent: Mar. 28, 1995

[54] SEPARATION METHOD FOR SOLID CONSTITUENTS OF A SUSPENSION AND DEVICE FOR CARRYING OUT THIS METHOD

[75] Inventor: Andre G. Mignot, Brie-Comte-Robert, France

[73] Assignee: Eastman Kodak Company, Rochester, N.Y.

[21] Appl. No.: 39,207

[22] PCT Filed: Oct. 3, 1991

[86] PCT No.: PCT/FR91/00775
§ 371 Date: Apr. 6, 1993
§ 102(e) Date: Apr. 6, 1993

[87] PCT Pub. No.: WO90/07968
PCT Pub. Date: Jul. 26, 1990

[30] Foreign Application Priority Data

Oct. 18, 1990 [FR] France .................. 90 13148

[51] Int. Cl.⁶ .............................. B01D 37/04
[52] U.S. Cl. .......................... 210/781; 209/1; 209/155; 209/208; 210/805
[58] Field of Search ............ 210/194, 321.67, 321.68, 210/360.1, 360.2, 380.1, 512.1, 781, 805, 808; 209/144, 211, 155, 208, 1, 3, 3.1, 4, 7, 44.1, 44.3; 229/724

[56] References Cited

U.S. PATENT DOCUMENTS

| 1,679,372 | 8/1928 | Pease ................ 209/44.1 |
| 3,008,543 | 11/1961 | Bourdale et al. ........ 183/63 |
| 3,801,280 | 4/1974 | Shah et al. ............ 23/230 |
| 4,369,698 | 1/1983 | Hemfort et al. ........ 99/486 |
| 4,692,248 | 9/1987 | Stannard et al. ...... 210/403 |
| 4,695,381 | 9/1987 | Ragnegard ............ 210/403 |
| 4,720,473 | 1/1988 | Welch et al. ........ 209/44.3 |
| 4,755,300 | 7/1988 | Fischel et al. ........ 210/650 |
| 4,764,276 | 8/1988 | Berry et al. .......... 210/264 |
| 4,790,942 | 12/1988 | Shmidt et al. ..... 210/321.68 |
| 4,900,440 | 2/1990 | Ziegler et al. .... 210/321.68 |
| 4,959,122 | 9/1990 | Kurematsu et al. ..... 210/781 |
| 5,160,633 | 11/1992 | Hong et al. .......... 210/781 |

FOREIGN PATENT DOCUMENTS

| 1207441 | 2/1960 | France ............... 210/304 |
| WO90/07968 | 7/1990 | WIPO ................. 210/781 |

Primary Examiner—Joseph W. Drodge
Attorney, Agent, or Firm—Carl F. Ruoff

[57] ABSTRACT

The present invention is a filtration method and device for separating particles of a suspension according to their mass. The invention includes a rotating uncloggable filter. The filter rotates inside of a stationery housing. Separation by particle size is achieved by adjusting the rotational speed of the filter. The filter is particularly useful for washing photographic suspensions.

2 Claims, 10 Drawing Sheets

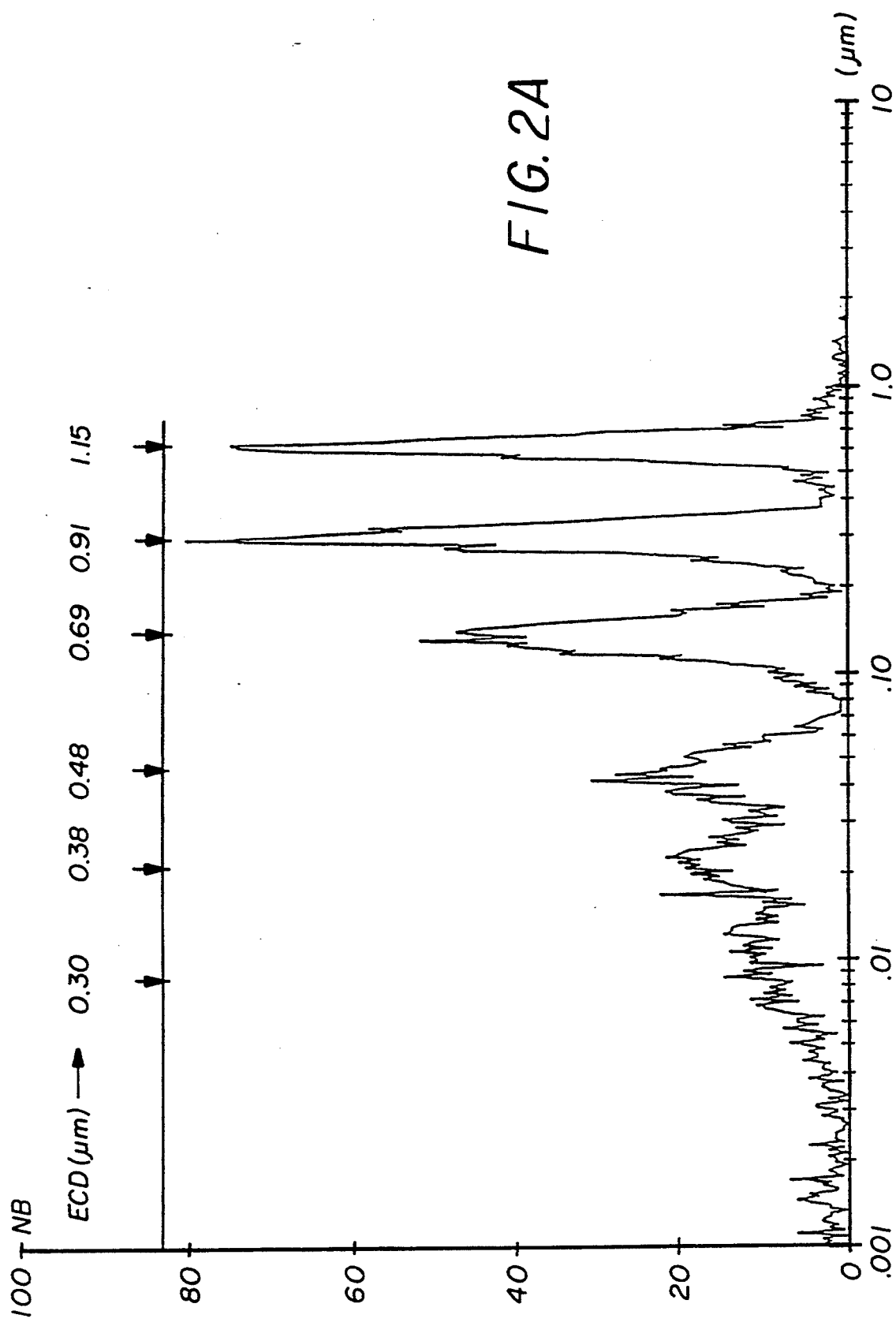

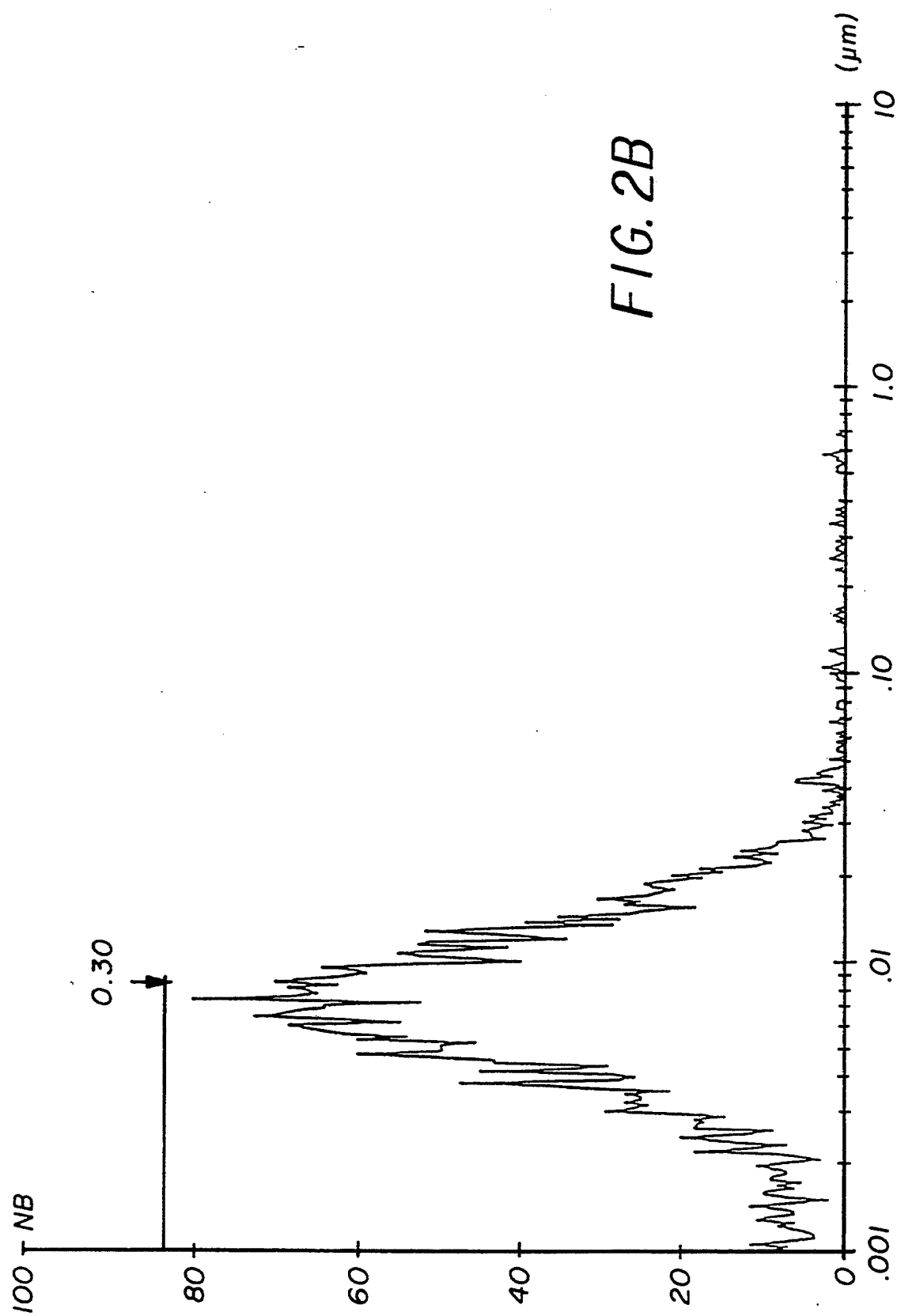

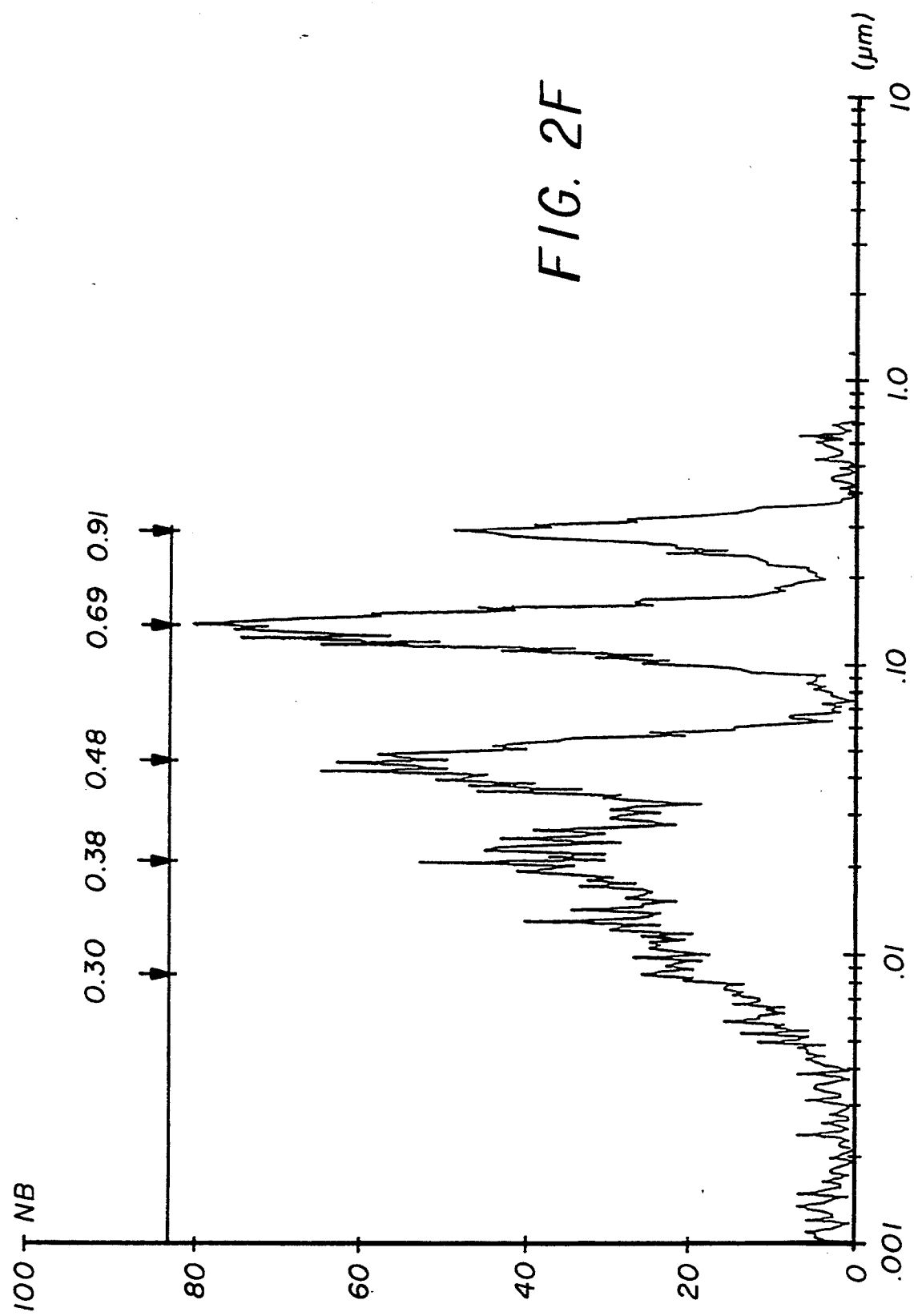

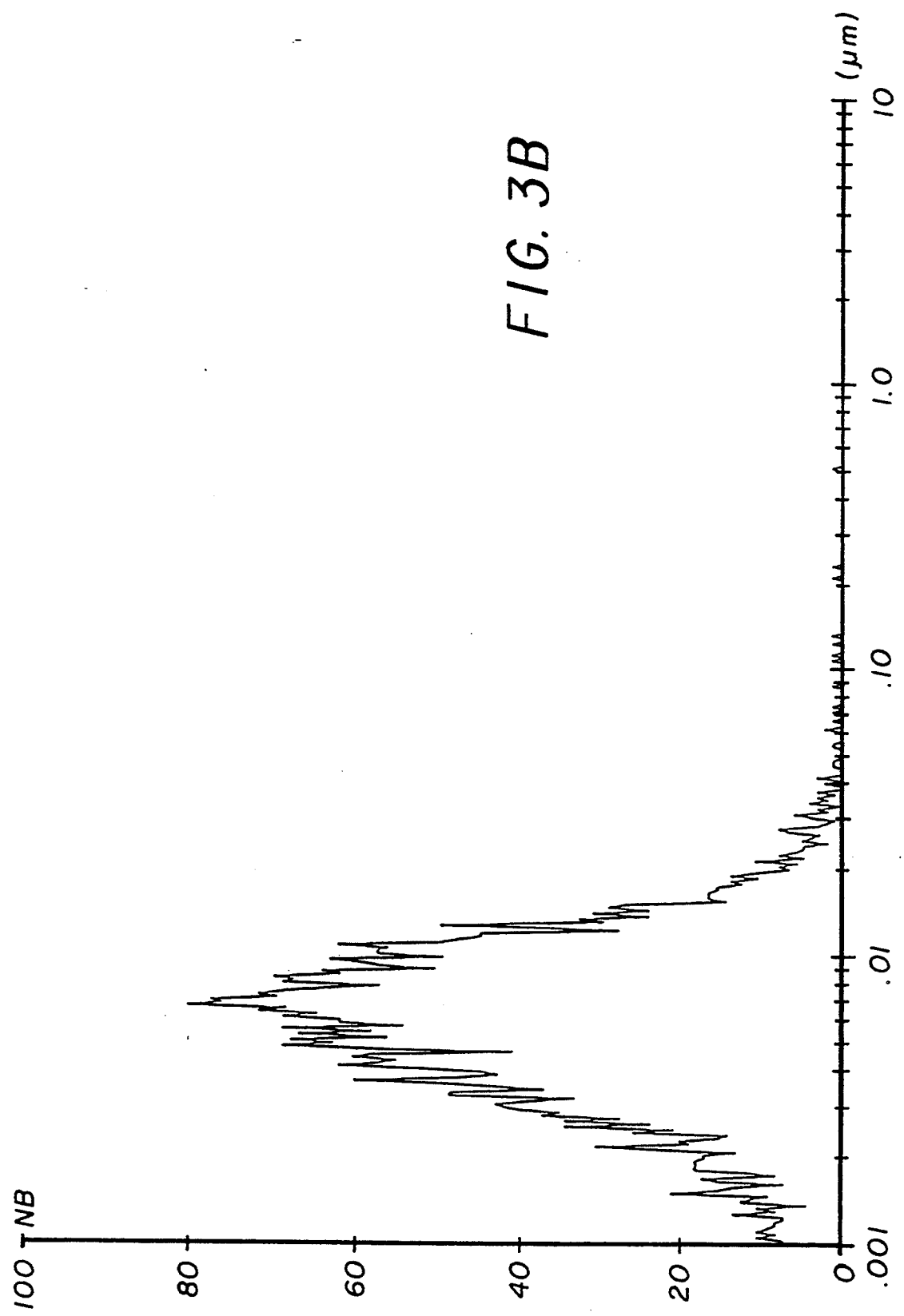

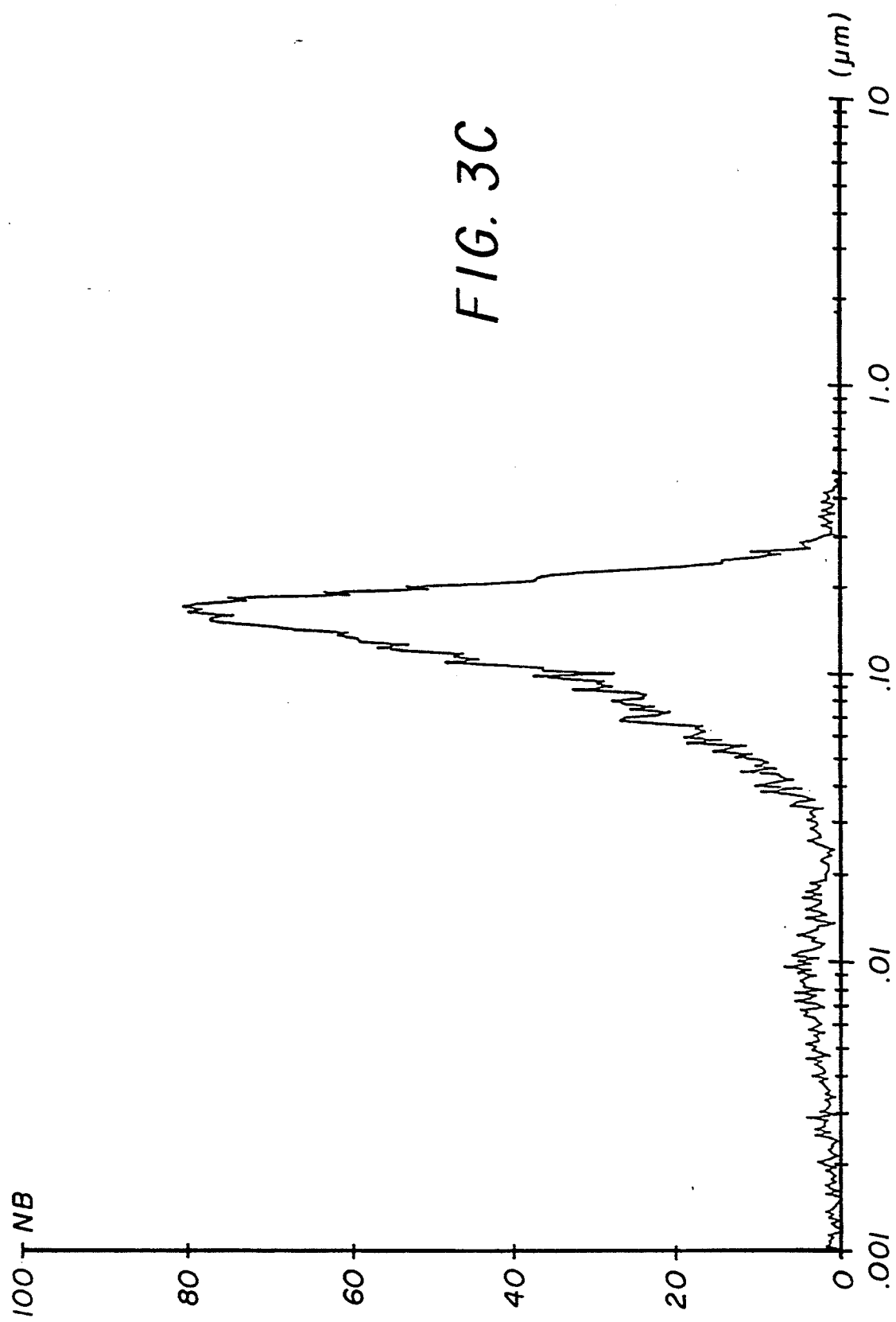

SEPARATION METHOD FOR SOLID CONSTITUENTS OF A SUSPENSION AND DEVICE FOR CARRYING OUT THIS METHOD

The invention relates to a separation method for solid constituents having different sizes contained in a suspension as well as a filtration device for carrying out this method. The method and device according to the present invention can also be used to wash such suspensions.

Up to now, a technique commonly used to separate solid constituents contained in a suspension consists in using a rotating filter wherein the solution to be filtered is introduced; the filter is rotated so that, due to centrifugal forces acting on the particles, the ones having a size less than the filter pores diameter pass through the rotating filter. The particles which pass through the filter are then recovered in a stationary housing surrounding said rotating filter. Thus, U.K. Patent 2 178 332 discloses a rotating filtering cylinder allowing to filter a determined amount of sand. This patent provides a device allowing to spray a washing fluid on the surface of the rotating cylinder, allowing to clean the filter after having used said filter a number of times. In fact, these devices exhibit drawbacks because they generate a quite rapid clogging of the filtering surface.

In the 70's, the cross flow filtration concept appeared. The principle consisted in directing the suspension parallel to the filter. This technique allowed to increase the filtration rate by minimizing the thickness of the polarizing layers near the filtration surface, depending on the pressure difference between the inner portion of the filtration surface and the outer portion of said surface. However, this technology exhibited the drawback to provide a filtration flow rate decreasing with time, due to the same clogging problem of the filtering surface.

In order to solve this problem, it was suggested to drive the filtering surface into rotation in order to remove the clogging problems and to allow an increase of the filtration flow rate of such filtration devices, the centrifugal forces, as a result of the filter rotation, thus preventing in fact the particles of greater size than the pores size of the filtering surface to deposit. Such devices allowed, with respect to the stationary devices, to multiply the filtration flow rate by six.

However, such devices do not allow a selective separation of particles having different sizes, as would be desired in presence of a suspension including a plurality of particles populations exhibiting different sizes, in order to be able, for example, to isolate such or such type of particles. Up to now, such operations require in fact to change the filtration surface, which is often complex and penalizing as regards to an economical point of view.

By way of example, such a device is disclosed in the French Patent 1 207 441; according to this patent, the filtration device includes a stationary tight housing in which the fluid to be filtered is introduced and an inner rotating filtering surface, the whole filtering device being continuously or intermittently rotated and comprising a pleated, undulated or embossed filtering medium, in order to increase the filtering surface.

Thus, it is an object of the present invention to provide a filtration device of the cleaning by centrifuging type, the filter cutting threshold of which can be modified without changing the filtration surface.

It is another object of the present invention to provide an uncloggable filtration device.

It is still another object of the present invention to be able, for a suspension exhibiting a determined granulometric distribution curve, to isolate a particular range of particles sizes located elsewhere in the distribution curve.

It is still another object of the present invention to provide a device designed to wash suspensions such as photographic emulsions.

It is yet another object of the present invention to provide a device allowing, in a suspension such as a photographic emulsion, to separate particles according to their shape.

Other objects of the present invention will appear during the following detailed disclosure.

The objects of the present invention are achieved by providing a separation device for solid constituents having different sizes contained in a suspension comprising:

- a hollow rotating filtering cylinder, said cylinder including at one of its ends, an outlet allowing to discharge the filtrate, the pressure inside the rotating filter being $P_i$;
- a stationary cylindrical housing surrounding said rotating filter, said cylindrical housing being arranged so that its walls define with the rotating cylinder a gap sufficient to allow the circulation of the suspension to be filtered on the outer portion of the filtering wall of said rotating cylinder, until reaching the desired separation level, the pressure inside said gap being $P_e > P_i$, said stationary housing comprising two orifices, the first one allowing to introduce the suspension to be filtered, the second one allowing to discharge the unfiltered volume before being recycled by said first orifice;
- means allowing to drive into rotation said rotating filtering cylinder, said device being characterized in that it further includes means allowing to modify the drive speed of said rotating filtering cylinder, such that the effective area of the pores of said cylinder may be substantially modified.

A method for separating solid constituents having different sizes contained in a suspension is also provided by means of a device comprising a filtering cylinder, the inner pressure of said cylinder being $P_i$, and, a stationary cylindrical housing surrounding said filtering cylinder and arranged so that the walls of said cylindrical housing define with said filtering cylinder a circulating gap in which the pressure is $P_e > P_i$, said method comprising the following steps:

1) driving into continuous rotation said hollow filtering cylinder;
2) circulating the suspension on the outer portion of the filtering cylinder wall, until reaching the desired separation level, said stationary housing including two orifices, the first one allowing to introduce the suspension to be filtered, the second one allowing to discharge the unfiltered volume before being recycled by said first orifice;
3) discharging the filtrate from the inner zone of the filtering cylinder by means of an appropriate orifice; said method being characterized in that the effective area of the pores of said cylinder is modified by modifying the rotation speed of said filtering cylinder.

According to the present invention, a method is also provided which consists, for a suspension exhibiting a determined granulometric distribution curve, with a particle size ranging from Sm to Sg, in isolating a determined range of particle sizes (Si; Sj) where Sm≦Si<Sj≦Sg, by means of a device including a hollow filtering cylinder, the inner pressure of the filtering cylinder being Pi, and a stationary cylindrical housing surrounding said hollow cylinder and arranged so that the walls of said cylindrical housing define with said filtering cylinder a circulating gap in which the pressure is Pe>Pi, said method including the following steps:

a) adjusting the cylinder rotation speed so that the rotating filter lets pass only the particles having a size less than Si;

b) circulating the suspension on the outer portion of the filtering cylinder wall, until reaching the desired separation level, said stationary housing including two orifices, the first one allowing to introduce the suspension to be filtered, the second one allowing to discharge the unfiltered volume prior to being recycled by said first orifice;

c) discharging the filtrate from the inner zone of the filtering cylinder by means of an appropriate orifice;

d) repeating the steps a) to c) of the method with the unfiltered volume, by adjusting the rotation speed of the cylinder so that the filter lets pass only the particles, the size of which is less or equal to Sj, the resulting filtrate containing only particles, the size of which is ranging between Si and Sj.

According to another alternative, it is provided a method consisting, for a suspension exhibiting a determined granulometric distribution curve, with a particle size ranging between Sm and Sg, in isolating a determined range of particle sizes (Si; Sj) where Sm≦Si<Sj≦Sg, by means of a device including a hollow filtering cylinder, the inner pressure of the filtering cylinder being Pi, and a stationary cylindrical housing surrounding said hollow cylinder and arranged so that the walls of said cylindrical housing define with said filtering cylinder a circulating gap in which the pressure is Pe>Pi, said method including the following steps:

a) adjusting the cylinder rotation speed so that the rotating filter lets pass only the particles, having a size less or equal to Sj;

b) circulating the suspension on the outer portion of the filtering cylinder wall, until reaching the desired separation level, said stationary housing including two orifices, the first one allowing to introduce the suspension to be filtered, and the second one allowing to discharge the unfiltered volume prior to being recycled by said first orifice;

c) discharging and recovering the filtrate from the inner zone of the filtering cylinder by means of an appropriate orifice;

d) repeating the steps a) to c) of the method with the recovered filtrate, by adjusting the cylinder rotation speed so that the filter lets pass only the particles, having a size less than Si, the resulting unfiltered volume containing only particles, the size of which is ranging between Si and Sj.

The following detailed disclosure will be made with reference to the drawings, wherein:

FIG. 2A-2F are diagrams illustrating the steps of a separation method according to the present invention, applied to a photographic emulsion;

FIG. 3A-3C are diagrams illustrating the steps of another example of separation according to the present invention.

Figure 1:
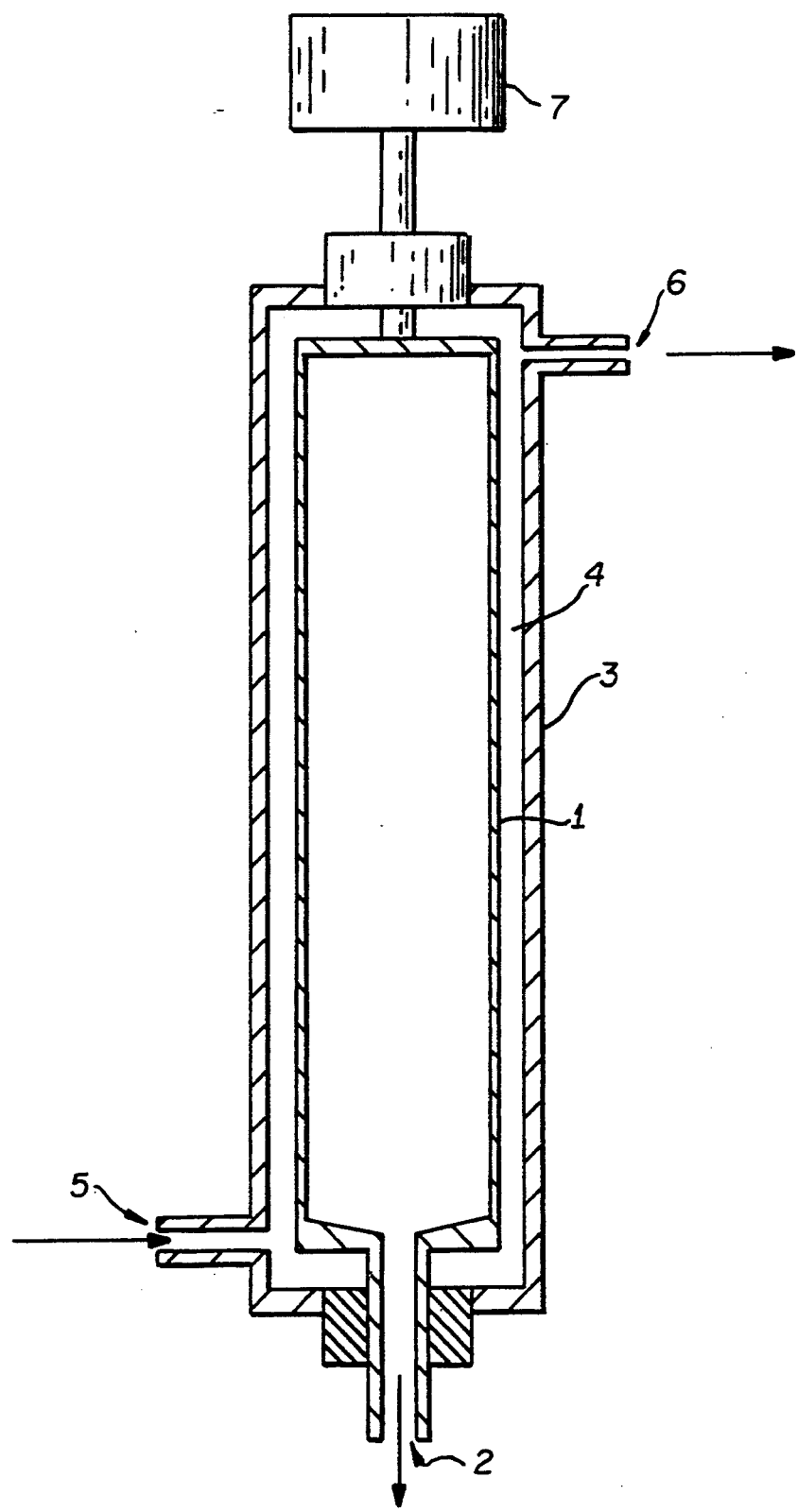
FIG. 1 illustrates a filtration device according to the present invention.

Now, referring to FIG. 1, an embodiment of the rotating filter according to the present invention is schematically illustrated. It mainly includes a hollow rotating filtering cylinder (1), the wall of which is formed of a porous material. According to an embodiment, this filtering wall is formed of sintered metal such as sintered stainless steel. The pore size forming the filtering surface is chosen according to the particle size forming the composition of the suspension to be filtered. Preferably, in order to avoid clogging of the filtration surface, the pore size is at least bigger than the size of the biggest particle present in the suspension. The rotating filter comprises at one of its ends an outlet (2) allowing to discharge the filtrate. According to the embodiment illustrated in FIG. 1, the outlet size of the filtrate is less than the rotating cylinder diameter. According to another embodiment, the outlet diameter is at least equal to the cylinder diameter, appropriate means being then provided in order to collect the filtrate. The device according to the present invention includes also a stationary cylindrical housing (3) surrounding said rotating cylinder (1). Said stationary housing is arranged so that its walls define with the rotating cylinder a gap (4) sufficient to allow the circulation of the suspension to be filtered on the outer portion of the filtering wall of said rotating cylinder, until reaching the desired separation level. The width of this gap (4) ranges preferably between 1 mm and 50 mm and more preferably is in the order of 5 mm. This stationary housing comprises two orifices, a first one (5) allowing to introduce the suspension to be filtered, a second one (6) allowing to discharge the unfiltered volume before it will be recycled by said first orifice (5). The rotating cylinder is rotated by means of a variable speed motor (7). As it will be explained in more detail below, modifying the drive speed of the rotating cylinder allows to substantially modify "the effective area" of the pores of said cylinder, thus allowing to adjust the filter cutting threshold without modifying the filtration surface. In fact, a same filtration surface will exhibit, according to the speed at which it is driven, a different "cutting threshold", the speed variation modifying, as will be explained in more detail below, the virtual pore surface. The pressure Pi inside the rotating cylinder (1) is less than the pressure Pe existing between the rotating cylinder and the stationary housing. In fact, the separation power of the filter depends essentially on three connected parameters: the filter cutting threshold (given by the manufacturer and which corresponds in statics to the size of the smallest particles stopped by the filter), the filter rotation speed, and the pressure difference Pe−Pi. Instead of rate, it would be more correct to speak of acceleration, as in fact the centrifugal force varies according to the filter radius and the speed square number. In the embodiment disclosed in the present application, the filter radius is 25 mm.

Thus, the lower the cutting threshold, the higher the pressure difference Pe−Pi must be. Likewise, the higher the speed, the bigger the pressure difference must be. By way of example, if the rotating filter is under the atmospheric pressure, the pressure difference Pe−Pi can vary between $10^3$ Pa and $10^6$ Pa, for a cutting threshold of 8 μm and a rotation speed ranging between 0 and 10,000 rpm. In the following examples, the pressure difference is about $4.10^4$ Pa.

With such a configuration, if the rotation speed is high enough, the laminar flow in the form of cylindrical sheets is replaced by a laminar flow of slightly different nature, characterized by a regular sequence of counter-rotating toroidal vortices, known as Taylor vortices. Provided that the rotating cylinder speed be less than a determined limit rate, the Taylor vortices keep their individual laminar nature inside the gap formed by the rotating cylinder/stationary housing on the whole axial length of said rotating cylinder. Such a Taylor vortices flow is moreover characteristic because it exhibits a laminar fluid boundary layer located beside the filtering surface which, due to the combination of the laminar shearing effects, exhibits substantially no Taylor vortices. A dimensionless number, similar to the Reynolds number, was defined in order to characterize this flow and is commonly called Taylor number. If r1 and r2 are the respective radius of the rotating cylinder and the stationary housing, and $\Omega$ is the angular velocity of said cylinder, the Taylor number is determined by the formula:

$$Ta = \frac{\Omega \cdot rho \cdot r1(r2 - r1)}{\mu} \cdot \left[ \frac{2(r2 - r1)}{(r1 + r2)} \right]^{\frac{1}{2}}$$

wherein rho is the density and $\mu$ the viscosity.

According to the conventional definition of a laminar flow, a Taylor flow, for a Taylor number ranging in a determined interval (generally between 40 and 4000) can be considered as laminar.

In use, the suspension is incorporated in the gap (4) between the rotating cylinder/stationary housing and circulates along and parallel to the filtration surface (1). The relative rotation movement of both surfaces generates three flows acting on the suspension: the main shearing effect caused by the rotating filtration surface, the Taylor vortices flow, and the axial flow of the suspension in the apparatus.

Now, we will consider the hydrodynamic aspect of the problem.

A device of the type disclosed in FIG. 1 is used, wherein the rotating cylinder radius (1) is r1 and its angular velocity $\omega$. Let us consider two volumic elements $V_1$ (a liquid volumic element, having a density $d_1$ and a surface $S_1$. Its mass is $M_1 = v_1 d_1$), and $V_s$ (solid volumic element having a density $d_s$, a surface $s_s$; its mass is $M_s = v_s d_s$.

Let us assume that $v_1 = v_s$; $s_1 = s_s$; $d_s > d_1$. Then, we have $M_s > M_1$.

The pressure inside the rotating filter is Pi; the one in the gap between the rotating filter/stationary housing is Pe, with Pe>Pi.

The liquid and solid volumic elements are submitted to opposite forces: a centrifugal force and a pressure.

The pressure:

$$F_p = (Pe - Pi)s_s = (Pe - Pi)s_1$$

This force tends to close the particles from the filtering surface.

The centrifugal forces:

. $F_1 = M_1 \omega^2 r$

. $F_s = M_s \omega^2 r$

These forces remove the particles and/or the liquid from the filtering surface.

As $M_s > M_1$, we have $F_s > F_1$.

Three cases must now be considered:

First case: $F_p > F_s > F_1$

If the pore diameter of the filtering surface is higher than the particle size. In this case, the liquid and solid elements pass through the filtering surface.

If the pore diameter of the filtering surface is less than the particle size, the filter acts as a conventional filter and thus is rapidly clogged.

This case is not of great interest since no separation occured.

Second case: $F_s > F_1 > F_p$

This case is not of interest also, since in these conditions, neither the particles nor the liquid pass through the filter.

Third case: $F_s > F_p > F_1$

In this case, only the liquid can pass through the filter, the particles, by the centrifugal force, are removed from the filtration surface.

Such a procedure can be used when it is desired to wash the particles in a suspension.

An interesting application of such a device is the separation of particles inside of a suspension. It will be assumed that the liquid contains particles having the same density but different sizes. (The reasoning will be the same for particles having the same size but with different densities).

Let us consider now a suspension exhibiting a determined granulometric distribution curve with a particle size ranging from Sm to Sg. Let us assume that, in this suspension, all the particles, having a size ranging from Si to Sj with $Sm \leqq Si < Sj \leqq Sg$ must be isolated.

In order to obtain this result, two procedures are possible. According to a first procedure, the rotating filter speed is adjusted, so that:

$F_{sg} > F_p > F_{sj} > F_{si} > F_{sm} > F_1$

In fact $F_p = F_{sj} + \epsilon$ ($\epsilon$ being negligible)

The suspension circulates on the outer portion of the cylinder wall, until reaching the desired separation level. Under these conditions, only the particles, having a size less or equal to Sj pass through the filter.

Then the filtrate is recovered and recirculated after having adjusted the cylinder speed, such that:

$F_{sj} > F_{si} > F_p > F_{sm} > F_1$

In fact $F_{si} = F_p + \epsilon$ ($\epsilon$ being negligible)

Only the particles, having a size less than Si pass through the filter, the resulting unfiltered volume containing only particles, the size of which is ranging from Si to Sj.

According to the second procedure, the rotating filter speed is adjusted such that:

$F_{sg} > F_{sj} > F_{si} > F_p > F_{sm} > F_1$

In fact $F_{si} = F_p + \epsilon$ ($\epsilon$ being negligible)

The suspension is recirculated on the outer portion of the rotating filter wall, until reaching the desired separation level. Only the particles, the size of which is less than Si pass through the filter. The unfiltered volume contains only particles having a size higher or equal to Si. The filtrate is discharged and the unfiltered volume is recirculated, by adjusting the rotation speed of the rotating filter so that:

$$F_{sg} > F_p > F_{sj} > F_{si}$$

In fact $F_p = F_{sj} + \epsilon$ ($\epsilon$ being negligible).

Only the particles, having a size less or equal to Sj pass through the filter. The filtrate contains only particles, the size of which is ranging from Si to Sj.

Various materials can be used to manufacture the filtration surface. By way of example, it can be sintered stainless steel, plastic such as polypropylene, ceramic or a metallic cloth.

According to a particular embodiment, the present device is used to separate solid constituents according to their geometrical shape. For this, a filter is formed, the pore shape of which is chosen according to the particle shape that may be desired to separate. By way of example, a cylinder with "pores" formed of slots arranged on the cylinder surface, can be manufactured.

This separation of the grains exhibiting different shapes occurs also when the grains have the same mass. To explain this, a negligible factor, compared to the mass, when the grains have different masses, must be considered. Indeed, in a medium such that, for example, a gelatinous medium, grains having different shapes exhibit different behaviours. In reality, in a whirling medium, the hydrodynamic volume of the grains having a determined shape (for example, 3 D grains) will be different from the hydrodynamic volume of the grains having a different shape (for example, tabular grains), the hydrodynamic volume corresponding to the liquid volume moved by a grain when it is moved in a determined medium. The forces connected to this hydrodynamic factor which correspond to resisting forces of the medium in which the grains are placed act in the same direction as the centrifugal forces. These hydrodynamic volume differences explain the separation which occurs between grains having similar masses but different shapes.

The pore size is not a critical parameter. According to the invention, satisfying tests were performed with cutting thresholds ranging up to 20 μm, allowing, with an appropriate rotation speed, to stop particles having a size in the order of 0.1 μm or less, by adjusting the rotation speed in an appropriate manner. As to the maximum size of the filter pores, this one is limited by the fact that the required pressure build-up must be carried out. Moreover, with pores having a more significant size, surface roughness problems are encountered. It is advantageous to have a filter, which smallest pores have a bigger size than the biggest particles to be filtered, because the clogging problems of the filtering surface are completely avoided.

EXAMPLE 1

An emulsion including six homodisperse emulsions is introduced into the filtration device. The curve obtained by electrolytic granulometric analysis (EGA) (based on the measure of the current required to reduce the grains present in the emulsion) of the original emulsion, showing the grain size distribution curve is illustrated in FIG. 2A. The curve exhibits six maxima (standardized at 80), corresponding to the six different grain sizes: 0.30 μm, 0.38 μm; 0.48 μm; 0.69 μm; 0.91 μm; 1.15 μm. The diagram illustrates in fact the grain percentage of each size by grain volume class. The grain number of each size in the mixture is substantially the same, but this does not obviously appear on the diagram, due to the logarithmic scale which flattens the maxima referring to the grains having a smaller volume.

Figure 2C:
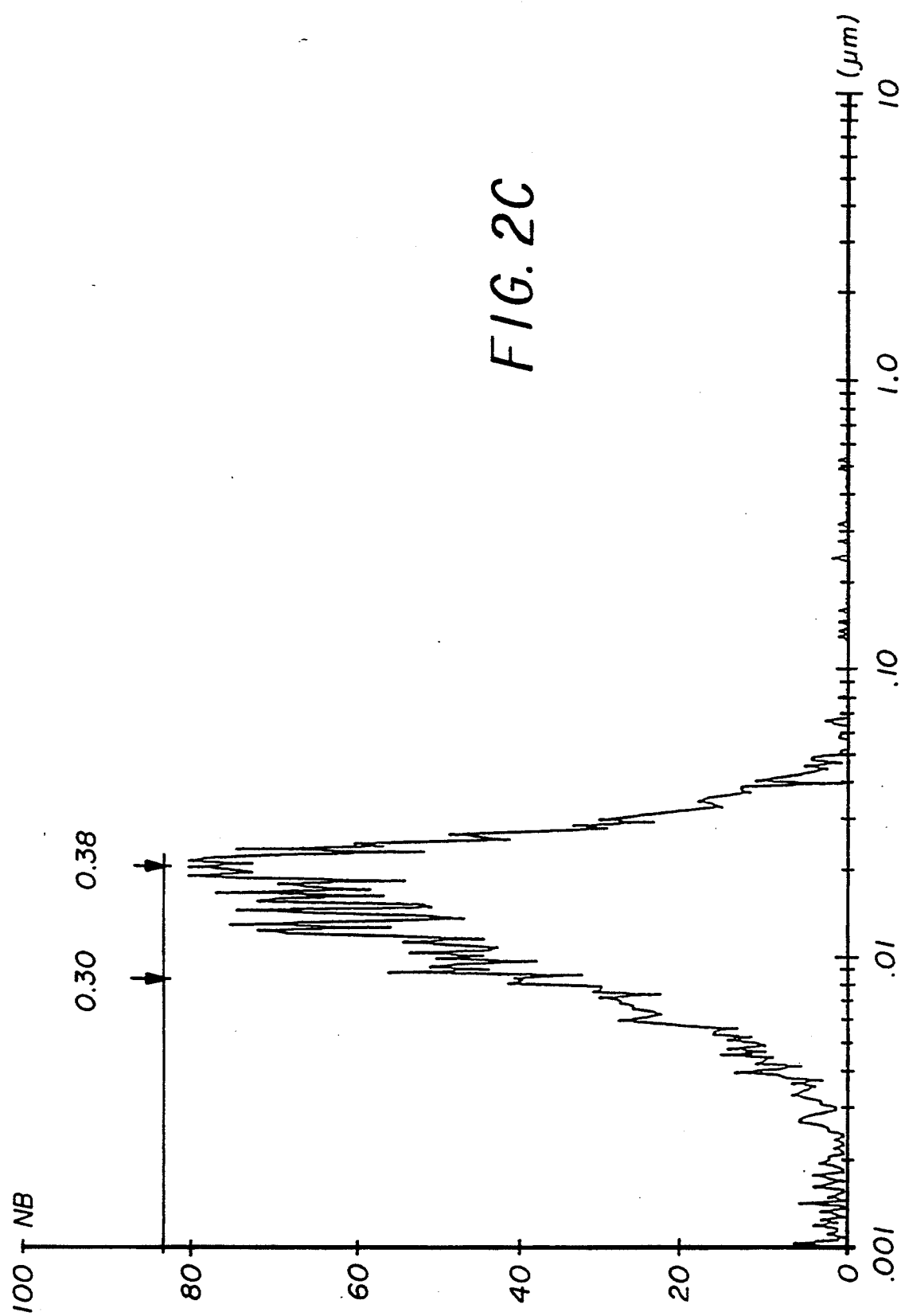
Figure 2D:
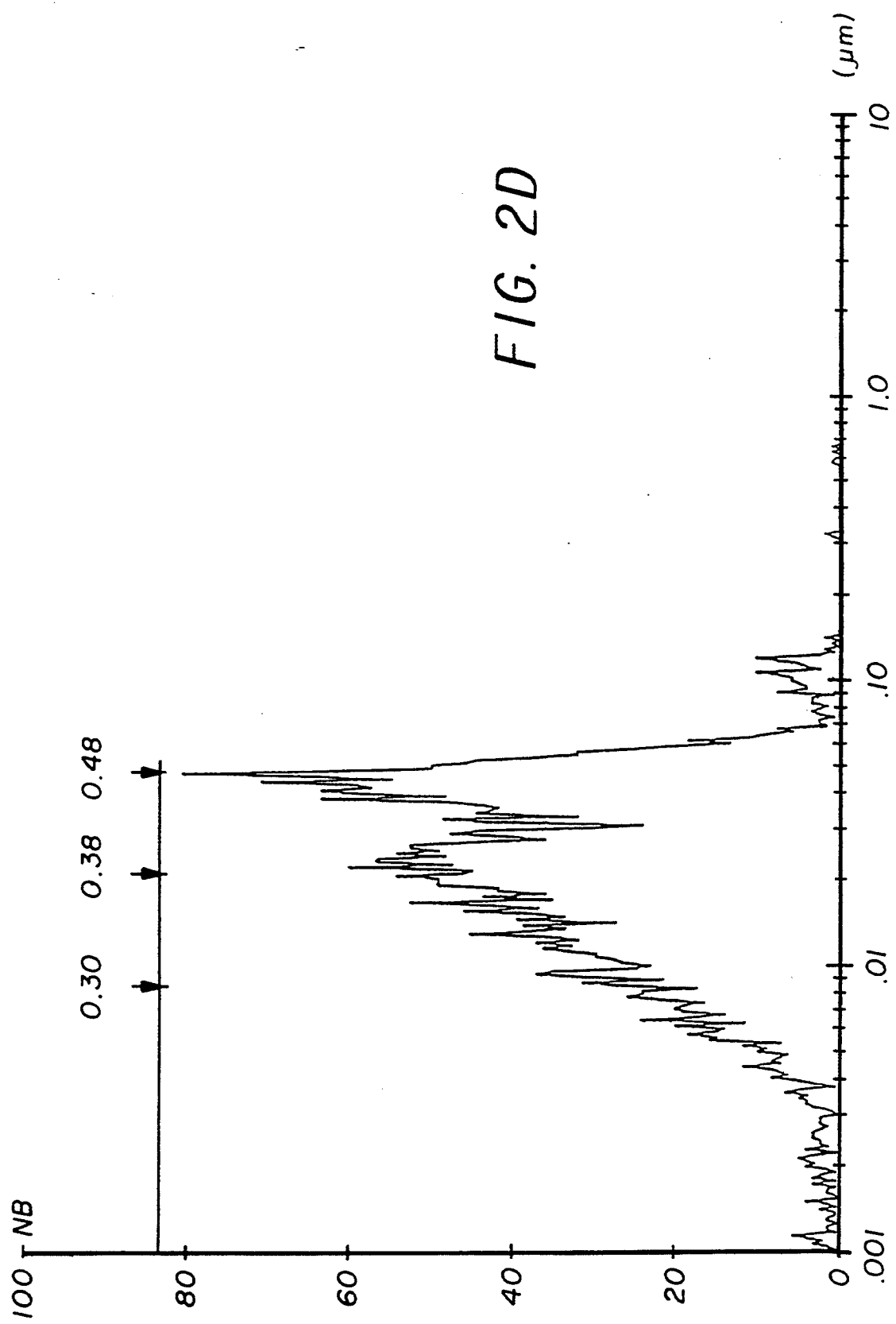
Figure 2E:
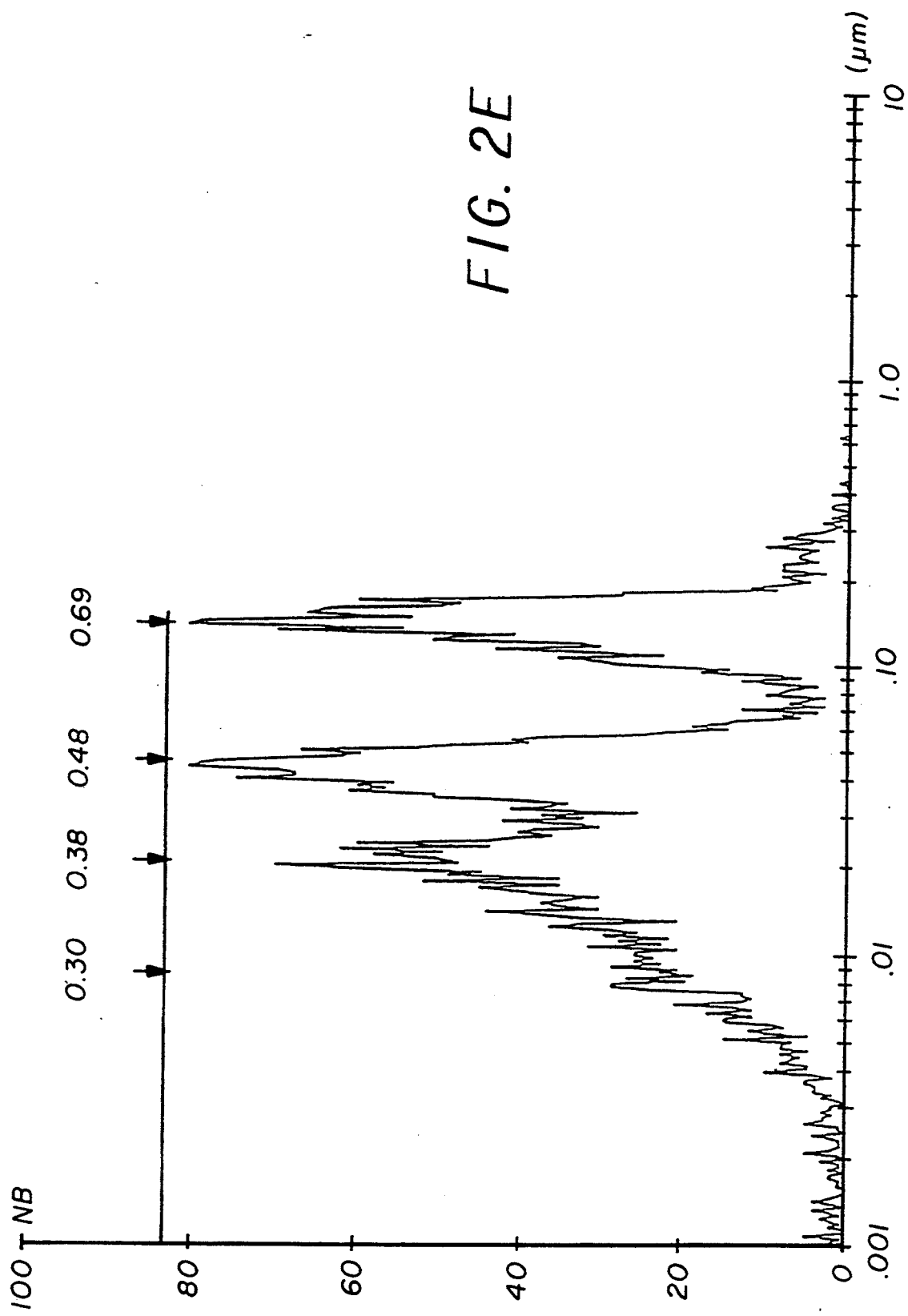

In order to separate the emulsion exhibiting a maximum at 0.30 μm, the filter rotation speed is adjusted at 2330 rpm. THE EGA of the filtrate is illustrated in FIG. 2B. Then, the filter rotation speed is reduced to 2095 rpm, in order to remove the emulsion exhibiting a maximum at 0.38 μm. The filtrate which EGA is illustrated in FIG. 2C contains a mixture of grains at 0.30 μm and 0.38 μm. Again, the filter rotation rate is reduced to 1850 rpm, in order to separate the emulsion exhibiting a maximum at 0.48 μm. The filtrate which EGA is illustrated in FIG. 2D contains a mixture of grains at 0.30 μm, 0.38 μm and 0.48. Then, the filter rotation speed is reduced to 1270 rpm in order to separate the emulsion exhibiting a maximum at 0.69 μm. The filtrate which EGA is illustrated in FIG. 2E contains a mixture of grains at 0.30 μm, 0.38 μm, 0.48 μm, and 0.69 μm. Finally, the filter rotation speed is reduced to 850 rpm, in order to separate the emulsion exhibiting a maximum at 0.91 μm. The filtrate which EGA is illustrated in FIG. 2F contains a mixture of grains at 0.30 μm, 0.38 μm, 0.48 μm, 0.69 μm and 0.91 μm.

If the filter rotation speed is still reduced, the original mixture of the six different emulsions is found again.

EXAMPLE 2

An emulsion containing tabular grains and three-dimensional grains is introduced into the device according to the present invention.

Figure 3A:
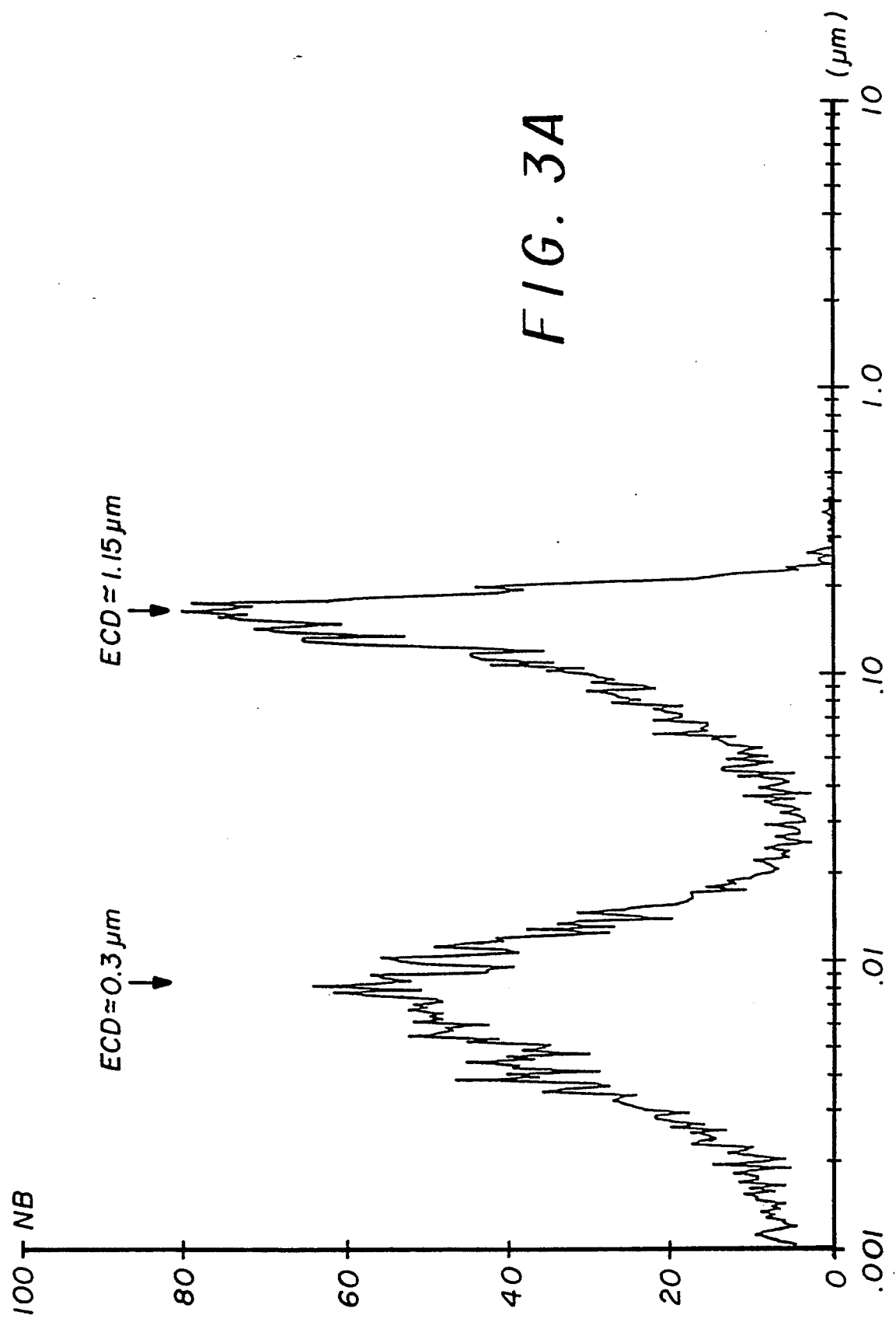

The grain size distribution of the original emulsion is illustrated in FIG. 3A. The EGA exhibits two maxima; one referring to the 3 D grains at 0.30 μm and the other referring to the tabular grains at 1.15 μm. The filter is driven into rotation at 2260 rpm. FIG. 3B illustrates the EGA of the filtrate which only contains 3 D grains. The unfiltered product which EGA is illustrated in FIG. 3C substantially contains tabular grains.

It must be noted that, compared to the first example, the maxima at 0.30 μm and at 1.15 μm do not exactly coincide on the abscissa axis. This is due to the fact that this axis is representative of the volumes and that the 0.30 and 1.15 μm values are here relative to the equivalent diameters. A tabular crystal having a 1.15 μm equivalent diameter has a smaller volume than a sphere having the same diameter. The offset value depends on the crystal thickness.

I claim:

1. Method comprising, for a suspension exhibiting a determined granulometric distribution curve, with a particle size ranging between Sm and Sg, in isolating a determined interval of particle sizes ranging between Si and Sj where Sm≦Si≦Sj≦Sg, by means of a device including a hollow filtering cylinder the wall of which is formed of a porous material, the inner pressure inside the filtering cylinder being Pi, and a stationary cylindrical housing surrounding said hollow cylinder and arranged so that the walls of said cylindrical housing defines with said filtering cylinder a vortex circulating gap in which the pressure is greater than Pi, said method including the following steps:
   a) adjusting the rotation speed of the cylinder such that the rotating filter lets pass only the particles, having a size less or equal to Sj;

b) circulating the suspension on the outer portion of the filtering cylinder wall, until reaching the desired separation level, said stationary housing including two orifices, a first one for introducing the suspension to be filtered, a second one for discharging an unfiltered volume the unfiltered volume being recycled to said first orifice;

c) discharging and recovering the filtrate from the inner zone of the filtering cylinder by means of an appropriate orifice;

d) repeating the steps a) to c) of the method with the recovered filtrate, by adjusting the cylinder rotation speed so that the filter lets pass only the particles, having a size less than Si, the resulting unfiltered volume containing only particles, the size of which is ranging between Si and Sj; and e) selecting the porous material to have pores of a size and shape effective in each of steps a) and d) to allow separation of constituents having approximately the same size as an effective area of said pores but having a different shape than said pores.

2. Method comprising, for a suspension exhibiting a determined granulometric distribution curve, with a particle size ranging between Sm and Sg, in isolating a given interval of particles sizes ranging between Si and Sj where $Sm \leq Si \leq Sj \leq Sg$, by means of a device including a hollow filtering cylinder, the wall of which is formed of a porous material, the inner pressure of the filtering cylinder being Pi, and a stationary cylindrical housing surrounding said hollow cylinder and arranged so that the walls of said cylindrical housing define with said filtering cylinder a vortex circulating gap in which the pressure is greater than Pi, said method including the following steps:

a) adjusting the cylinder rotation speed so that the rotating filter lets pass only the particles having a size less than Si;

b) circulating the suspension on the outer portion of the filtering cylinder wall, until reaching the desired separation level, said stationary housing including two orifices, a first one for introducing the suspension to be filtered, a second one for discharging an unfiltered volume, the unfiltered volume being recycled to said first orifice;

c) discharging the filtrate from the inner zone of the filtering cylinder by means of an appropriate orifice;

d) repeating the steps a) to c) of the method with the unfiltered volume, by adjusting the rotation speed of the cylinder so that the filter lets pass only the particles, the size of which is less or equal to Sj, the resulting filtrate containing only particles, the size of which is ranging between Si and Sj; and e) selecting the porous material to have pores of a shape effective in each of steps a) and d) to allow separation of constituents having approximately the same size as an effective area of said pores but having a different shape than said pores.

* * * * *